US012469840B2

United States Patent
Sherrick et al.

(10) Patent No.: US 12,469,840 B2
(45) Date of Patent: Nov. 11, 2025

(54) METHODS AND APPARATUSES FOR PASTE PRODUCTION AND APPLICATION ON ELECTRODE SUBSTRATES FOR LEAD ACID BATTERIES

(71) Applicant: Gridtential Energy, Inc., Santa Clara, CA (US)

(72) Inventors: Maureen Elizabeth Sherrick, Rolling Prairie, IN (US); Douglas G. Wilson, St. Charles, MO (US); Mark Thomas, Cupertino, CA (US)

(73) Assignee: Gridtential Energy, Inc., Santa Clara, CA (US)

( * ) Notice: Subject to any disclaimer, the term of this patent is extended or adjusted under 35 U.S.C. 154(b) by 32 days.

(21) Appl. No.: 18/542,414

(22) Filed: Dec. 15, 2023

(65) Prior Publication Data

US 2024/0204170 A1    Jun. 20, 2024

Related U.S. Application Data

(60) Provisional application No. 63/432,926, filed on Dec. 15, 2022.

(51) Int. Cl.
*H01M 10/14* (2006.01)
*H01M 4/20* (2006.01)

(52) U.S. Cl.
CPC ............. *H01M 4/20* (2013.01); *H01M 10/14* (2013.01)

(58) Field of Classification Search
CPC ................................. H01M 4/20; H01M 10/14
USPC .......................................................... 141/32
See application file for complete search history.

(56) References Cited

U.S. PATENT DOCUMENTS

| | | | | |
|---|---|---|---|---|
| 4,998,340 A | * | 3/1991 | Wheadon | H01M 10/14 29/623.3 |
| 2013/0029203 A1 | * | 1/2013 | Ross | H01M 4/14 429/211 |
| 2021/0194090 A1 | * | 6/2021 | Wood | H01M 10/14 |

FOREIGN PATENT DOCUMENTS

| | | |
|---|---|---|
| JP | S6298575 A | 5/1987 |
| JP | S62103990 A | 5/1987 |
| JP | S62274565 A | 11/1987 |
| JP | 2013073685 A | 4/2013 |
| JP | 2020102320 A | 7/2020 |
| WO | PCTUS2384434 | 12/2023 |

OTHER PUBLICATIONS

International Search Report and Written Opinion for International Patent Application No. PCT/US23/84434), mailed 20240423, 10 pages.

* cited by examiner

*Primary Examiner* — Jason K Niesz
(74) *Attorney, Agent, or Firm* — Schwegman, Lundberg & Woessner, P.A.

(57) ABSTRACT

A system to create a cell for a monopole or bipole lead acid battery includes a paster to produce wet paste, a first carrier structure to receive the wet paste, and a second carrier structure to receive an electrode substrate. A combining station combines the first carrier structure and corresponding wet paste and the second carrier structure and corresponding electrode substrate into an assembly. An ultrasonic welding system receives the assembly and provides mechanical pressure and ultrasonic energy to the assembly. A removal station via which to remove at least one of the first and second carrier structures to create a modified assembly.

15 Claims, 22 Drawing Sheets

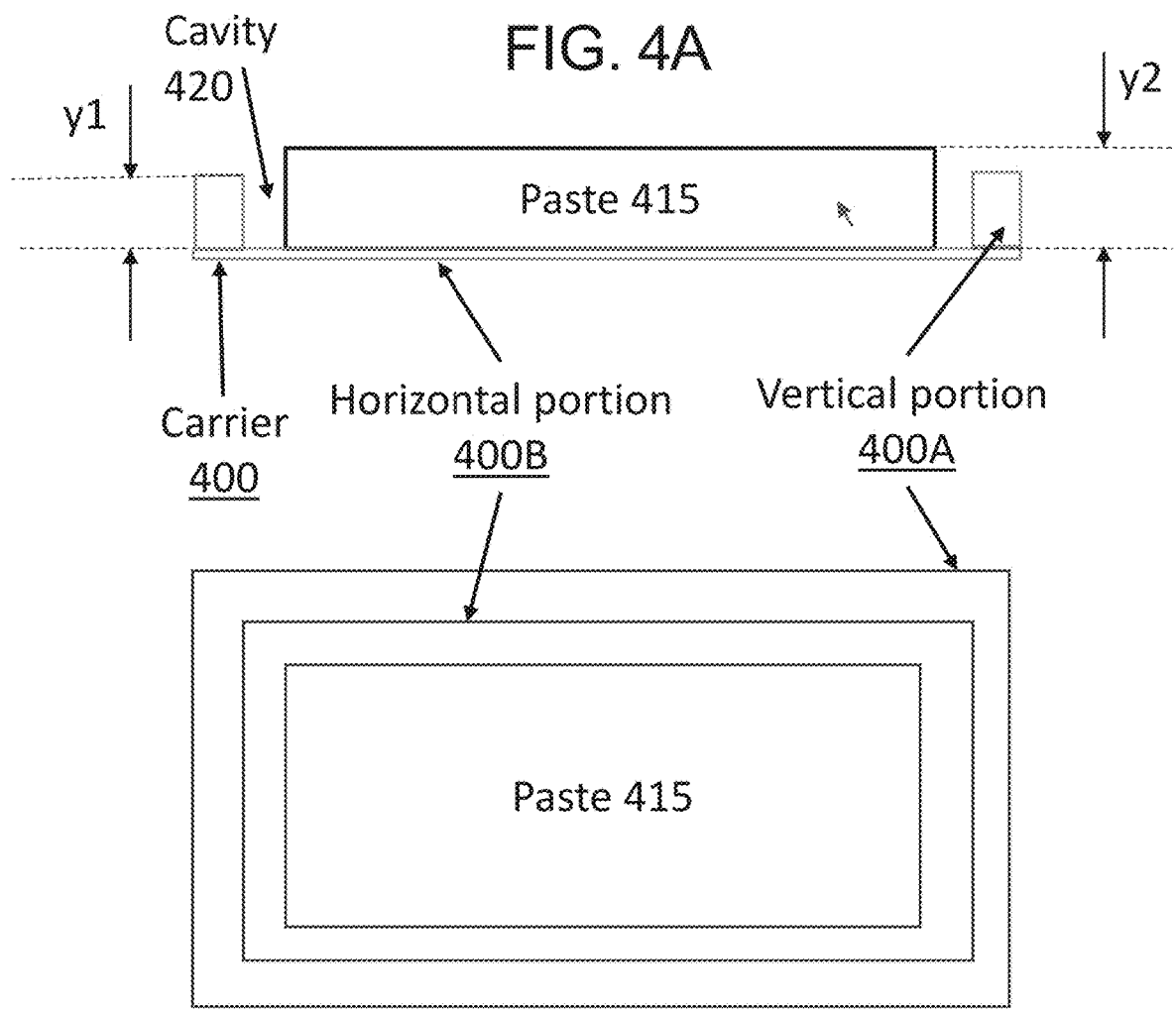

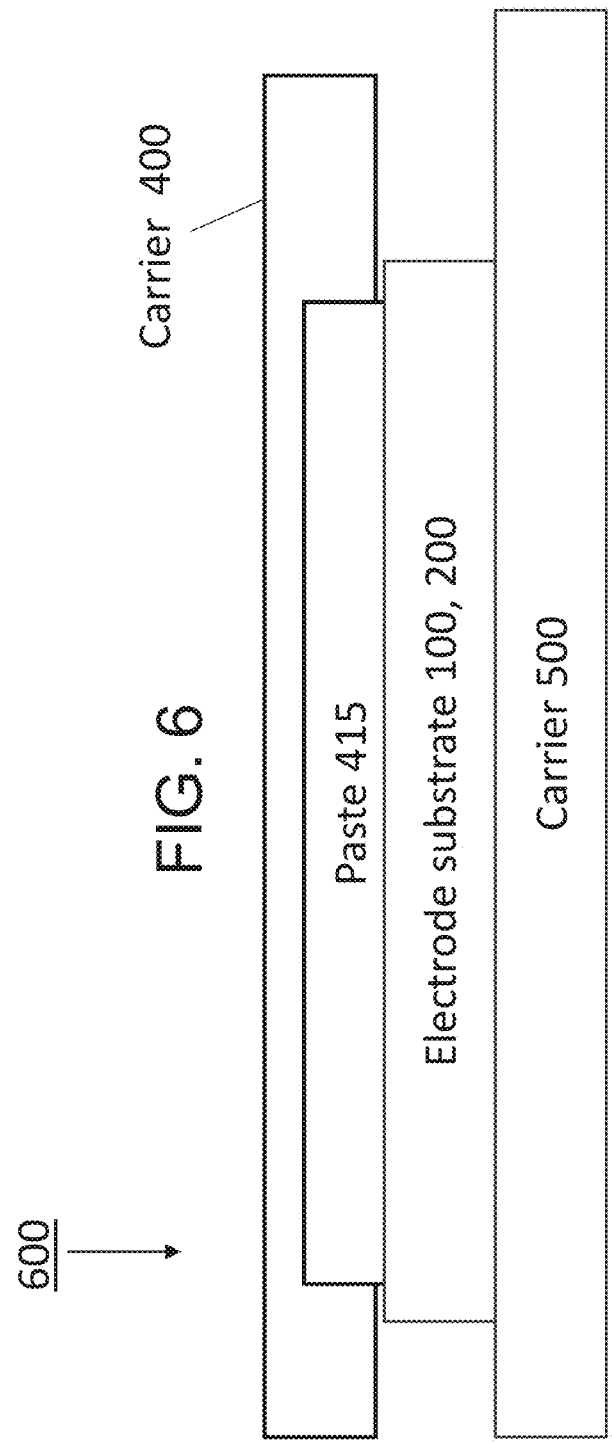

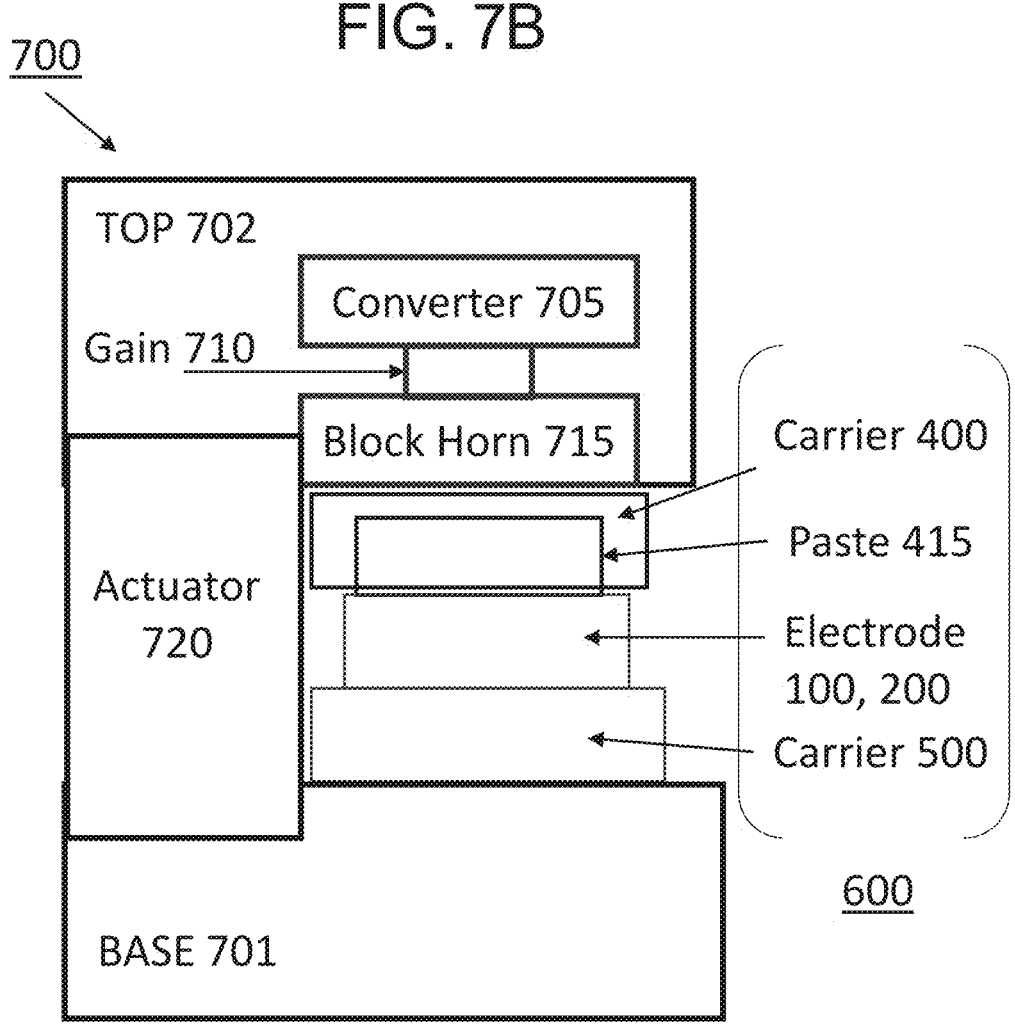

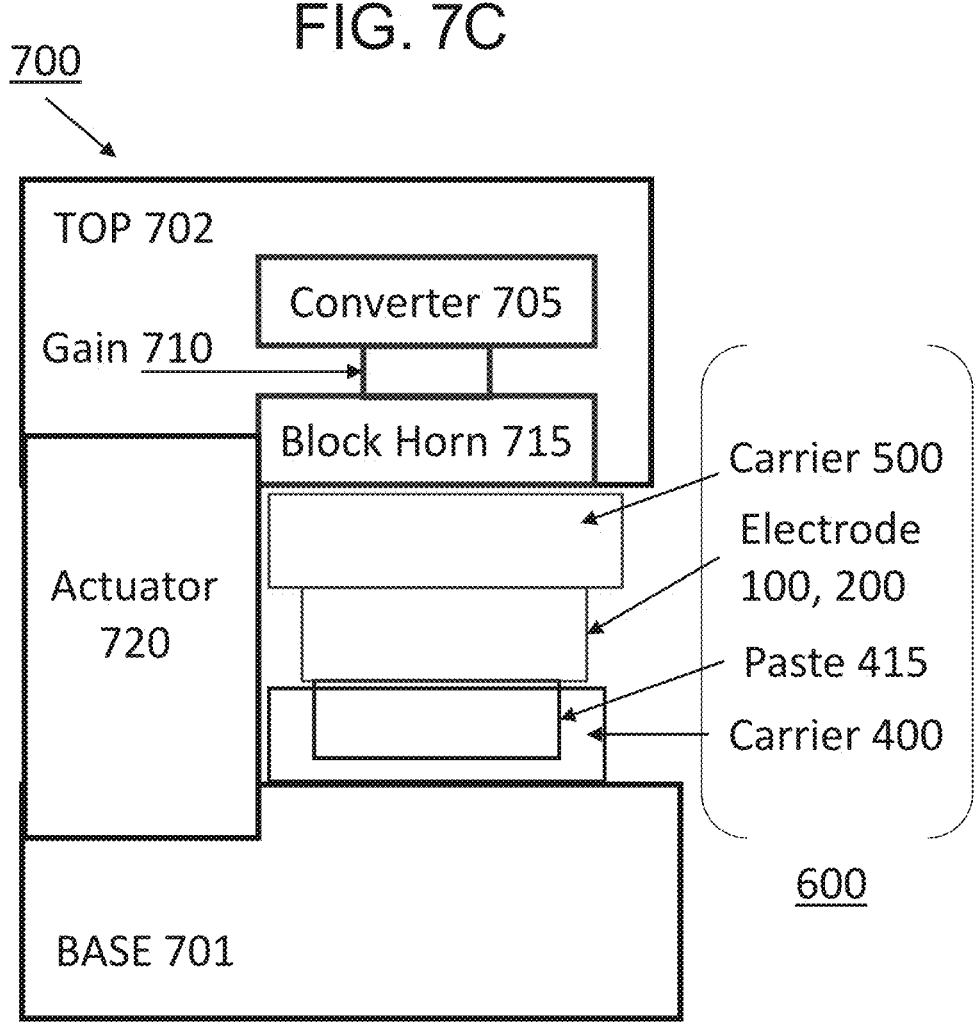

FIG. 9A
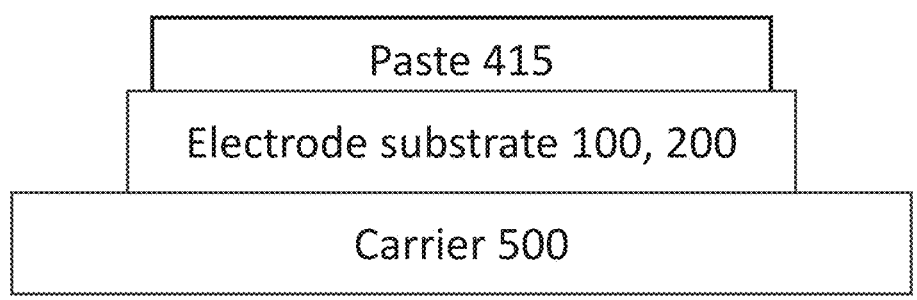
600 – SIDE VIEW
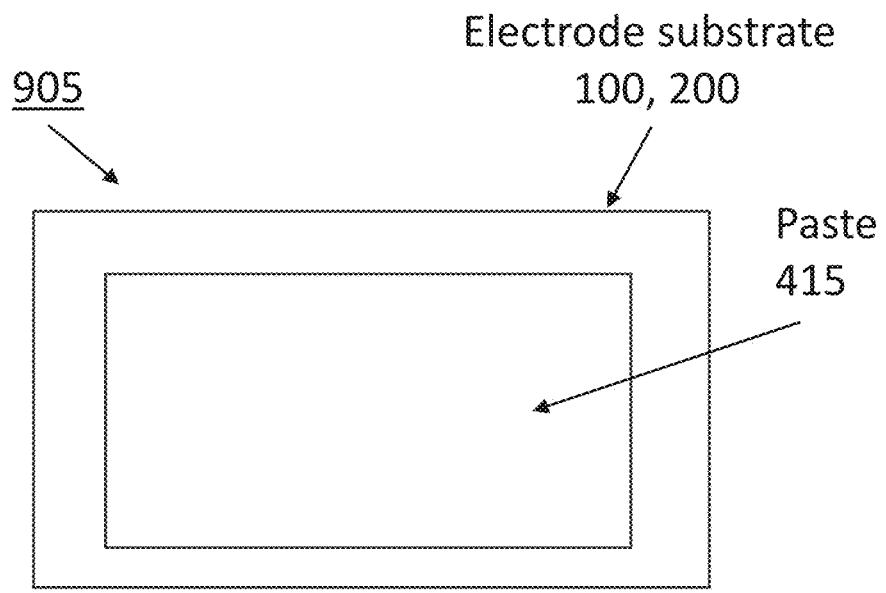
600 – TOP VIEW

FIG. 9B
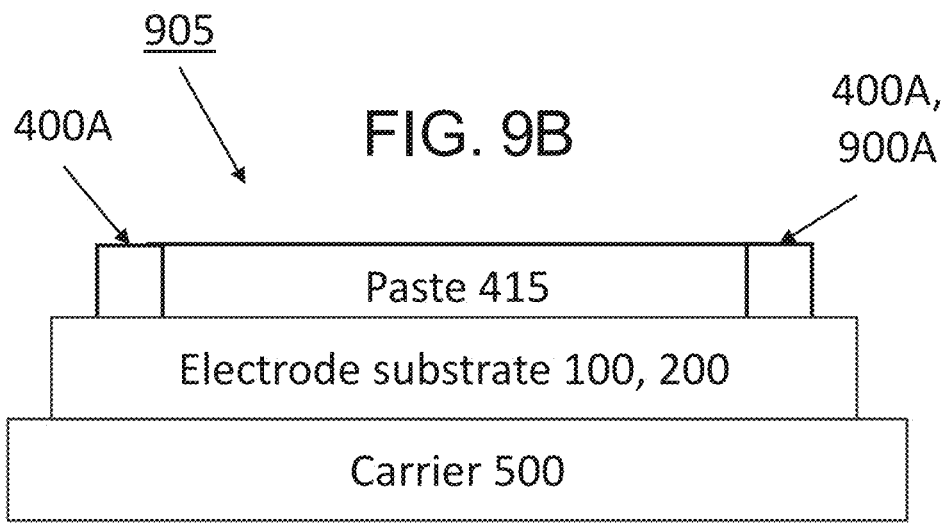
600 – SIDE VIEW
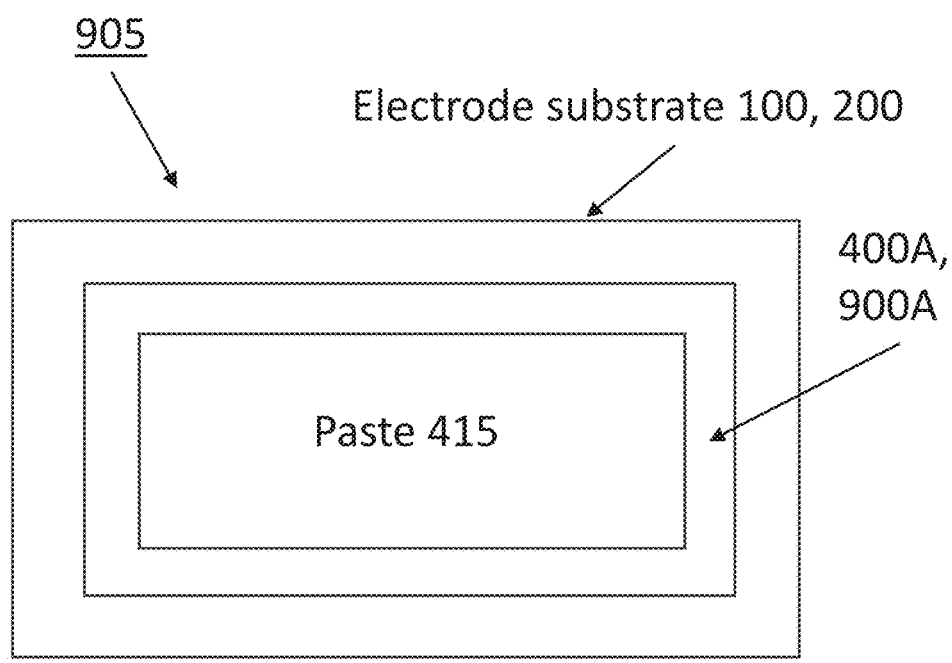
600 – TOP VIEW

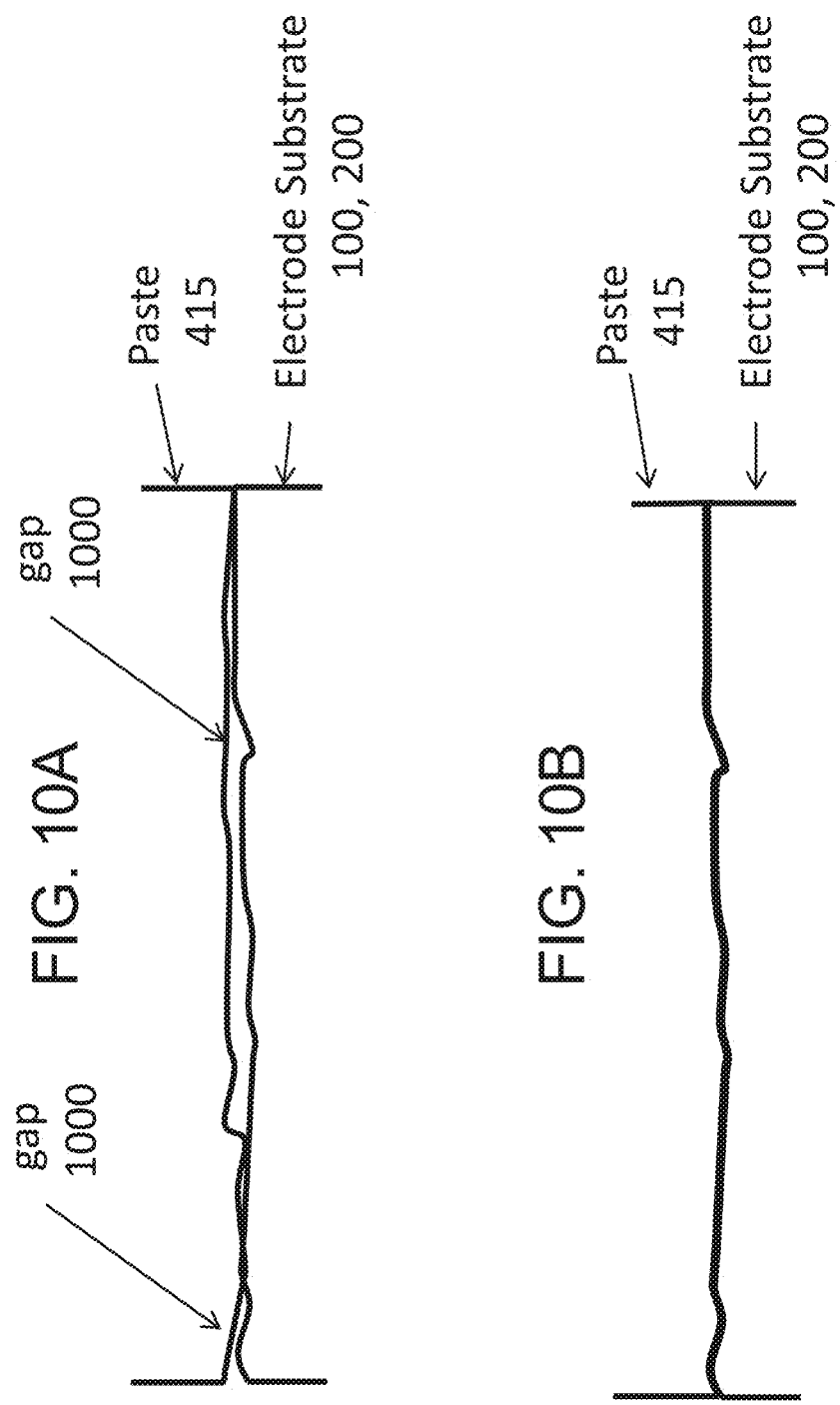

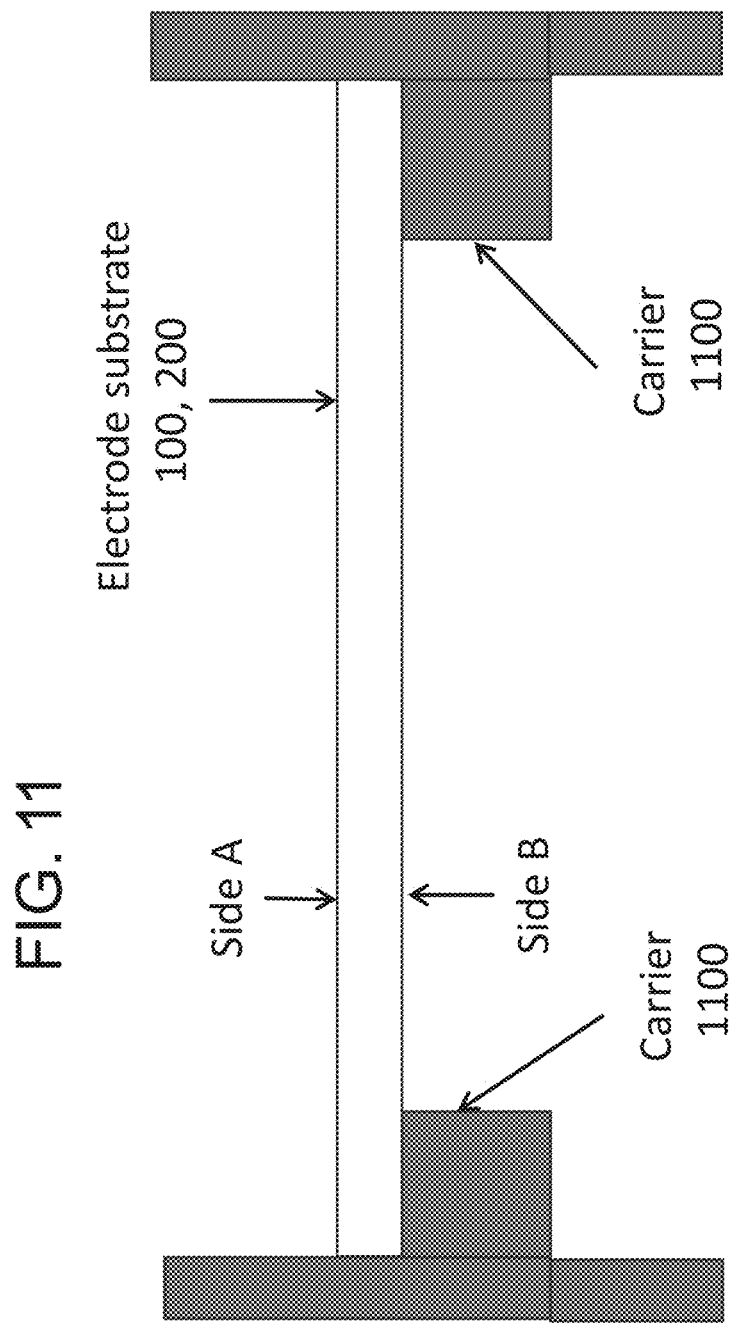

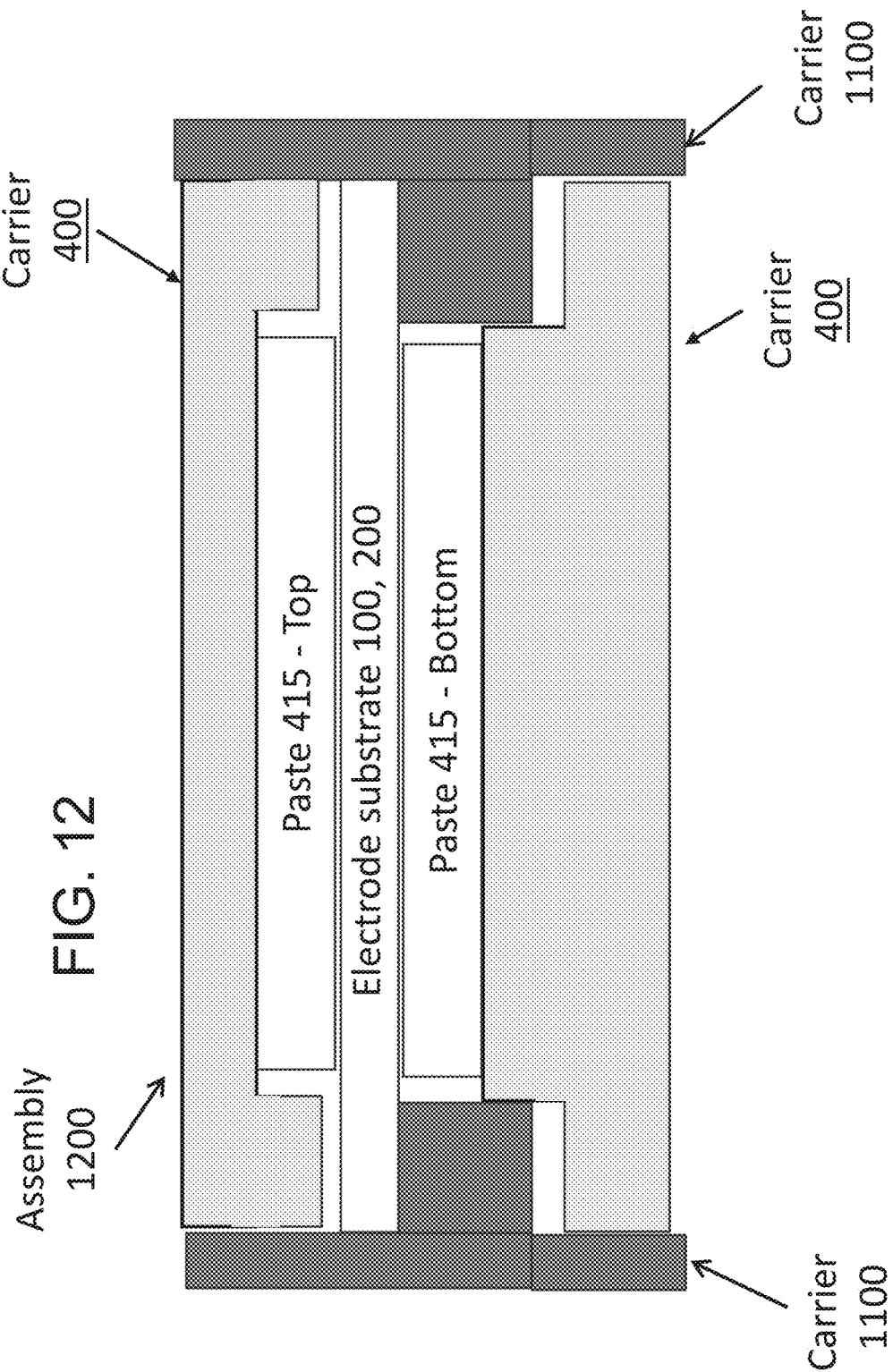

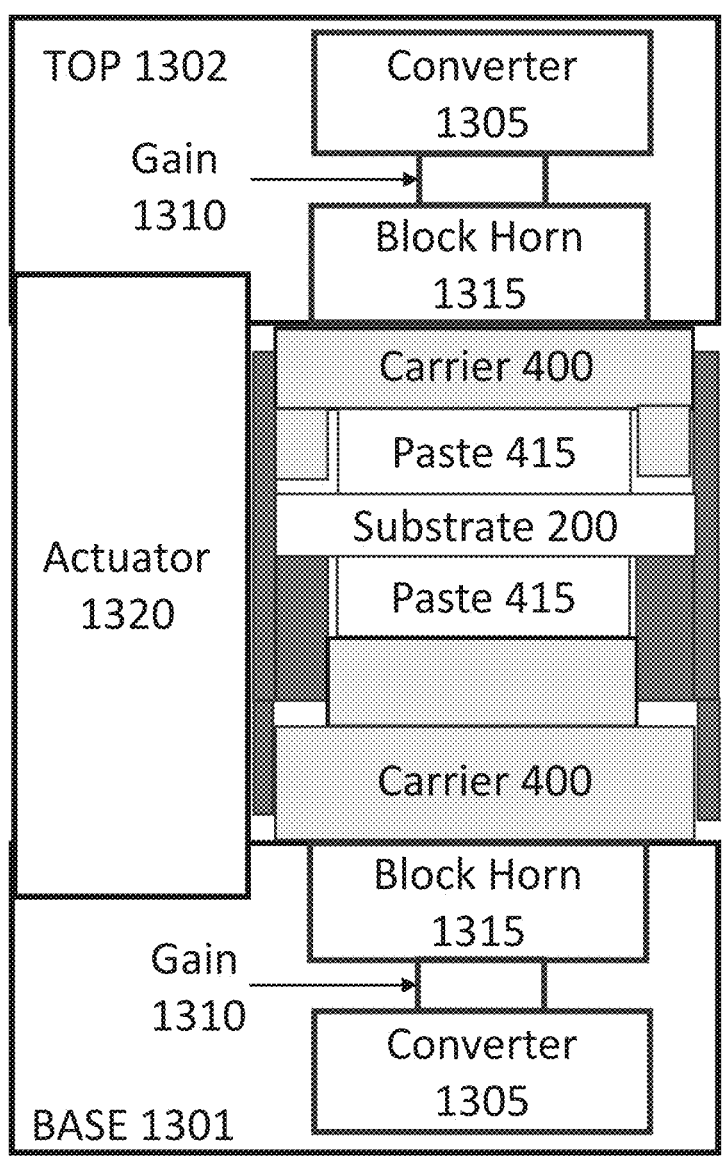

1400 FIG. 14

FIG. 15

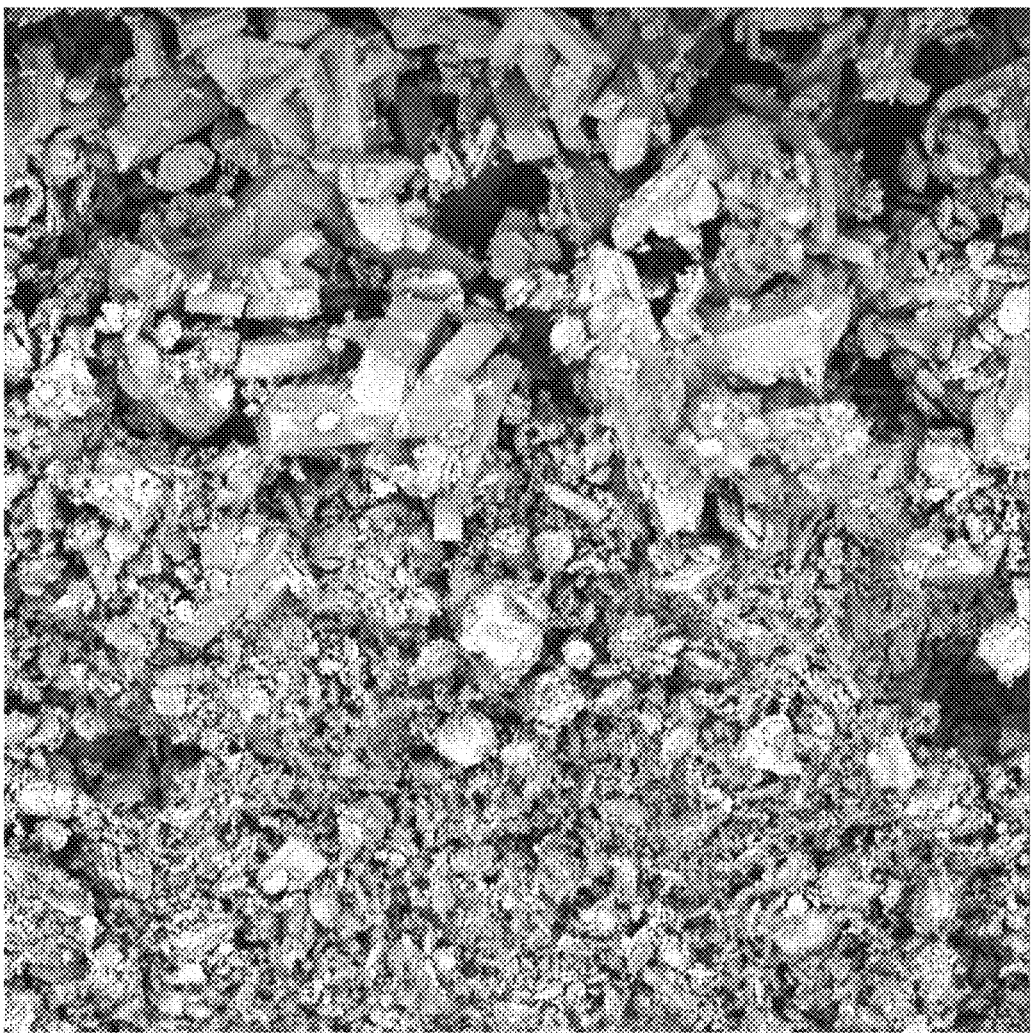

ns and gaps that occur during the pasting process. Likewise, it is difficult to formulate a paste that can meet the conflicting requirements of the applications.

METHODS AND APPARATUSES FOR PASTE PRODUCTION AND APPLICATION ON ELECTRODE SUBSTRATES FOR LEAD ACID BATTERIES

CLAIM OF PRIORITY

This U.S. Patent application claims the benefit of U.S. Provisional Patent Application No. 63/432,926, filed Dec. 15, 2022, entitled "Methods and Apparatuses for Paste Production and Application on Electrode Substrates for Lead Acid Batteries", the disclosure of which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention generally to lead acid batteries, and in particular to methods and apparatuses for producing and applying paste to conductive electrode substrates for lead acid batteries.

BACKGROUND

With reference to FIGS. 1 and 2, lead acid batteries may be manufactured using monopolar or bipolar electrode substrates 100, 200. Positive and negative active material (PAM 210 and NAM 205) are each mixed into a paste, for example, a thixotropic paste, which is directly applied to a conductive electrode substrate 100, 200, or simply, electrode substrate 100, 200, or electrode 100, 200. For monopole batteries, using a grid type electrode substrate 100 is advantageous from the perspective of manufacturing. However, the flow of paste onto and/or around the grid may affect the volume of paste applied, may result in undesirable voids within the paste and may limit desirable intimate contact between the paste and electrode substrate. Similarly, for bipole batteries the interface between the paste 205 or paste 210 and the electrode substrate 200 may have voids and gaps. The performance and life of the battery is critically dependent upon the paste to electrode substrate interface. Pasting directly onto the electrode substrate provides better contact with the electrode substrate, which is a prerequisite for achieving a good corrosion layer in the curing and formation process.

There are challenges in applying paste in bipole electrodes. Traditional monopole pasting techniques cannot be easily adapted to bipole electrodes since different paste formulations are used on each side of the electrode. Furthermore, the mechanical forces used in monopole pasting processes may not be tolerated well by the electrode substrate. The use of external plates for active material, particularly for PAM 210, require higher pressures and increased planarity to achieve a good corrosion layer. It is difficult to formulate a paste that can meet the conflicting requirements of the applications. For monopole electrodes, even though the paste application process is well established, there is still room for improvement to purge voids

BRIEF DESCRIPTION OF THE DRAWINGS

Embodiments are illustrated by way of example, and not by way of limitation, and will be more fully understood with reference to the following detailed description when considered in connection with the figures in which:

FIG. 4A is a cross sectional view of a first carrier with paste.
FIG. 4B is a top view of the first carrier with paste.
FIG. 6 is a diagram of a first assembly combining the first and second carriers illustrated in FIGS. 4 and 5.
FIG. 7B is a diagram of a first assembly loaded into the ultrasonic system illustrated in FIG. 7A in a first orientation.
FIG. 7C is a diagram of the first assembly loaded into the ultrasonic system illustrated in FIG. 7A in a second orientation.
FIG. 9A is a diagram of a first assembly being prepared for curing without a mask.
FIG. 9B is a diagram of a first assembly being prepared for curing with a mask.
FIG. 10A is a diagram of an interface between paste and an electrode substrate before ultrasound system processing.
FIG. 10B is a diagram of an interface between paste and an electrode substrate after ultrasound system processing.
FIG. 11 is a diagram of a cross section of a second carrier with an electrode substrate.
FIG. 12 is a diagram of a second assembly with a modified second carrier mated with the top side of the first carrier with paste and a bottom side of the first carrier with paste.
FIG. 13B is a diagram of an ultrasonic system for dual side processing loaded with the second assembly.
FIG. 14 is a SEM photograph of a tetra-base paste.
FIG. 15 is a SEM photograph of a tri-based paste.

DETAILED DESCRIPTION

Embodiments of the invention generally improve the interface contact between the paste and the electrode substrate in monopole and bipole lead acid batteries. Embodiments employ methods in an electrode (plate) making manufacturing process that scale to high volume/low-cost production and improve paste formulations to enable superior adhesion and utilization of the active material.

Advantages of embodiments of the invention include an improved interface between the electrode substrate and the paste, resulting in an improved cycle life, reduced internal resistance, improved active material utilization including higher volumetric and gravimetric energy density, and improved dynamic charge acceptance enabled by paste filling of convoluted surfaces with high surface area.

Figure 1:
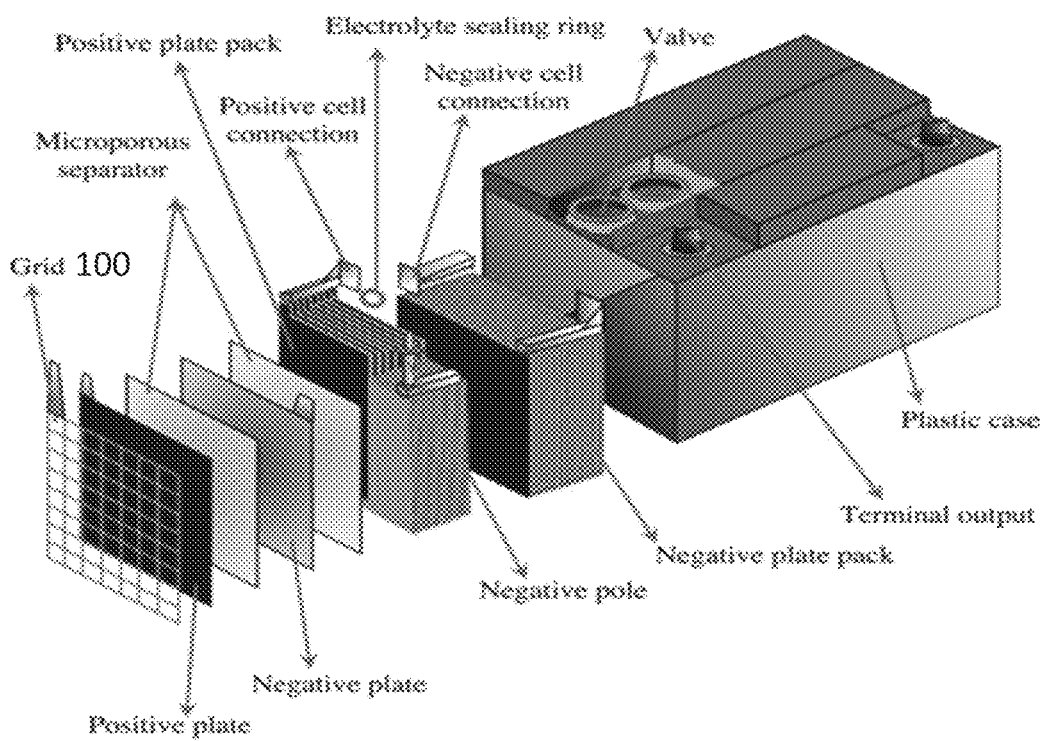
FIG. 1 is a diagram of a monopole battery.
Figure 2:
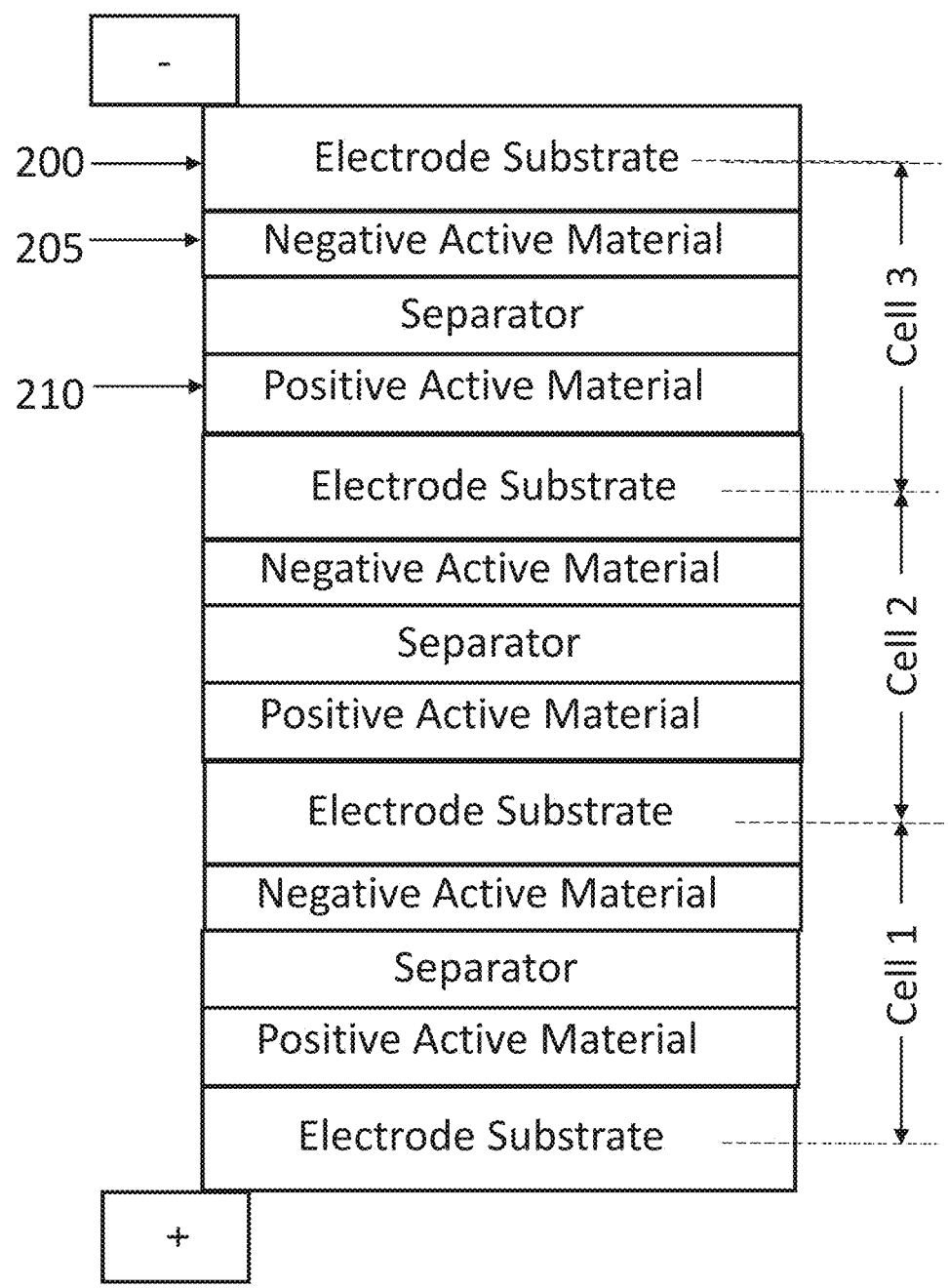
FIG. 2 is a diagram of a bipole battery.
Figure 3:
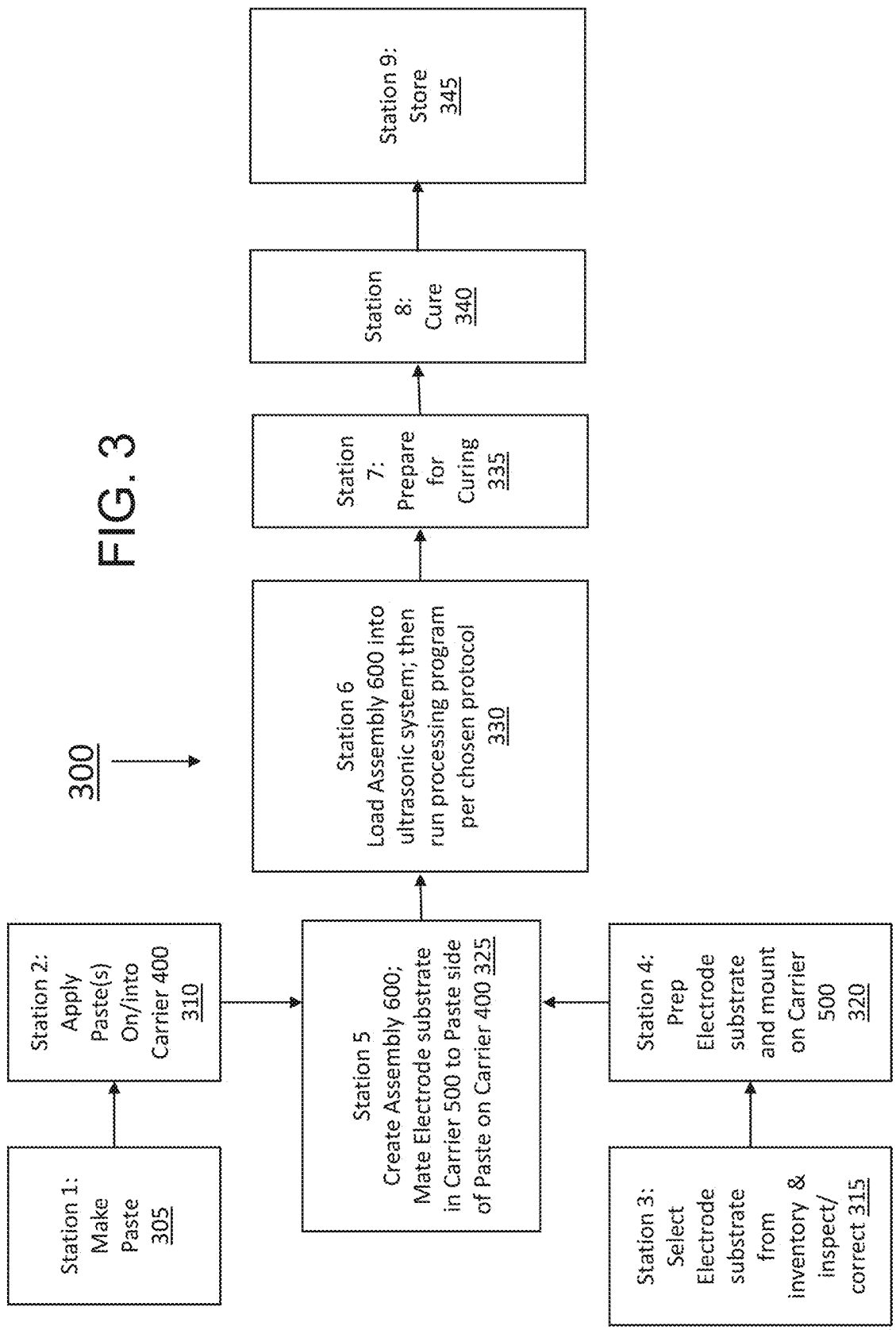
FIG. 3 is a flowchart of an exemplary manufacturing paste process.

With reference to FIG. 3, process steps 305-345 are associated with manufacturing workstations 1-9 depicted in the figure. The partitioning of various steps into separate workstations as depicted in FIG. 3 is one example of many possible permutations and arrangements. Some of the secondary issues associated with processing are not depicted in the drawings, such as non-stick non-porous layers for any materials touching the paste, inclusion of foam layers to fill voids between layers, etc. The process steps 305-345 are described below, station by station.

Station 1: A paster (a means of producing paste, either manually or automated) produces an amount of wet paste at step 305. The paste may be sectioned or segmented into desired dimensions.

Station 2: One or more sections or segments of paste are placed at step 310 into a first carrier structure, referred to herein as carrier 400. With reference to FIG. 4, carrier 400 may be a piece of paper, or a more complex structure. In different embodiments carrier 400 may provide different functions. One component and function of carrier 400 is a vertical portion 400A which allows for the lateral movement of paste 415 that may result from the combination of pressure and ultrasound energy. Vertical portion 400A limits the amount of lateral movement so it cannot exceed the dimensions of the cavity 420 defined by inside vertical surface of vertical portion 400A. Note that the vertical dimension y1 of vertical portion 400A is less than the vertical dimension y2 of paste 415. This allows force to be applied, for example, by an ultrasonic system, to paste 415 and limits the amount of vertical displacement of the paste. Another component and function of carrier 400 is a horizontal portion 400B that provides protection of the surface of the paste that is adjacent the horizontal portion 400B. Portion 400B comprises a material that does not adhere to the paste.

Station 3: An electrode substrate, e.g., electrode 100 or 200, to which the paste is to be applied, is first inspected and any debris or defects corrected at step 315.

Figure 5A:
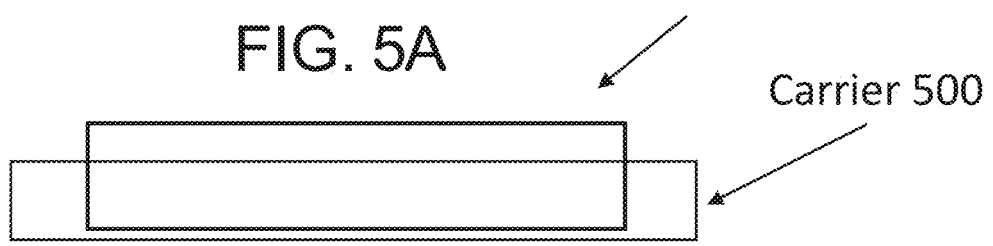
FIG. 5A is a side view of a second carrier with an electrode substrate.
Figure 5B:
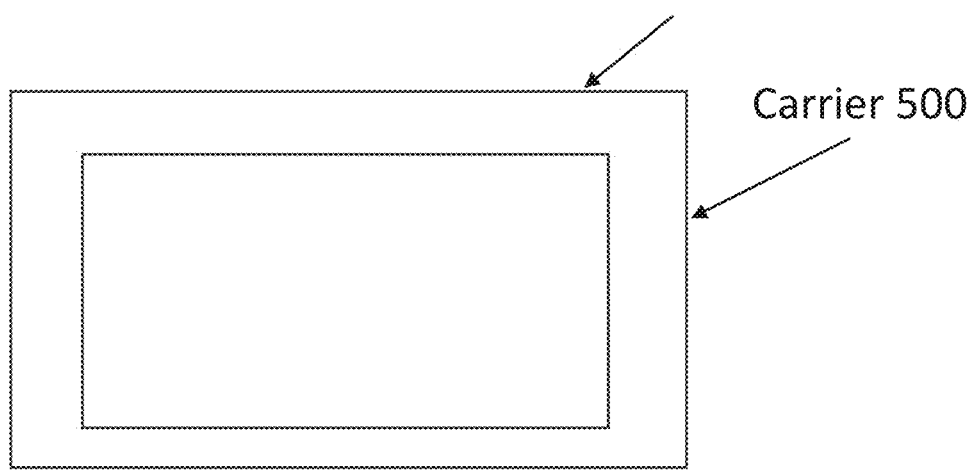
FIG. 5B is a top view of a second carrier with an electrode substrate.

Station 4: With reference to FIGS. 5A and 5B, the prepared electrode substrate 100, 200 is then placed into a second carrier, referred to herein as carrier 500, at step 320.

Station 5: Carrier 400 and Carrier 500 are positioned at step 325 so the paste 415 is brought into contact with the surface of electrode substrate 100, 200 to make assembly 600 depicted in FIG. 6

Figure 7A:
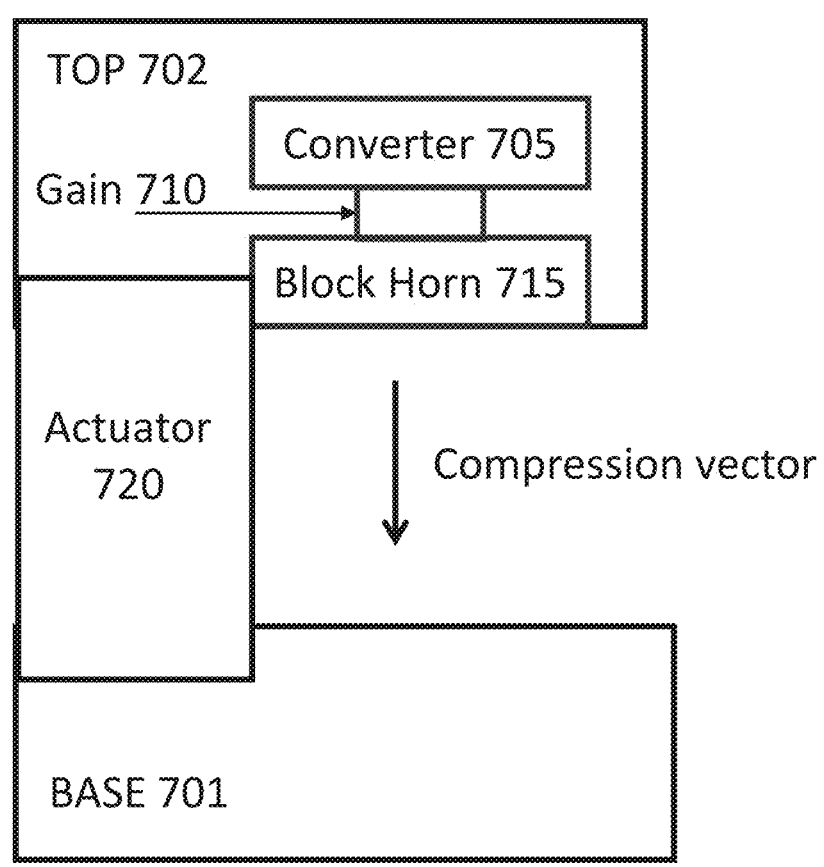
FIG. 7A is a diagram of an ultrasonic system.
Figure 8:
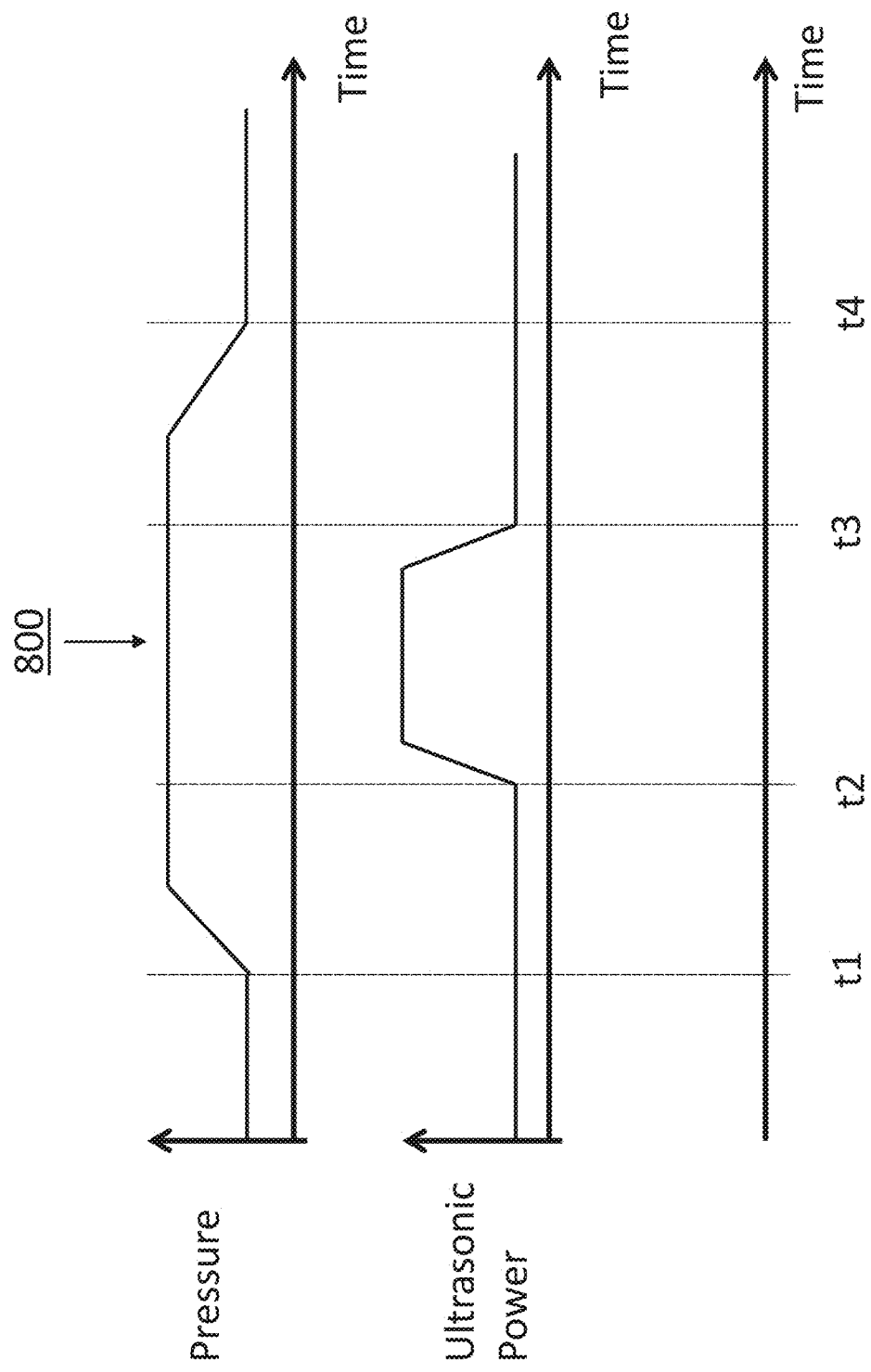
FIG. 8 is a diagram of an ultrasonic system run protocol.

Station 6: an ultrasonic system 700, such as shown in FIG. 7A, provides the means of providing mechanical pressure and ultrasonic energy to assembly 600. In one embodiment, the ultrasonic system is a typical ultrasonic welder such as the Branson branded 2000X series of ultrasonic welders available from Sonitek Corporation. The ultrasonic system 700 comprises a base 701, a top 702, a converter 705 that converts electrical energy into mechanical vibration, a coupling and gain section (aka a booster) 710 that provides gain to the amplitude of vibration and couples it to a horn 715, for example, a block horn, that provides an appropriate X-Y distribution to engage with assembly 600, a means to provide pressure in the z-direction, e.g., an electric motor or actuator 720. Assembly 600 can be positioned in the ultrasonic system as shown in FIG. 7B. An alternative embodiment is to invert assembly 600 and position it in the ultrasonic system as shown in FIG. 7C. In either case once assembly 600 is positioned in the ultrasonic system 700, then ultrasound energy and mechanical pressure is applied to assembly 600 per a desired protocol at step 330 that specifies the pressure, ultrasound frequency, power and amplitude of the ultrasound as a function of time, for example, as depicted in the graph 800 in FIG. 8.

Station 7: after assembly 600 has been processed at station 6, it is moved to station 7 to prepare for curing, at step 335. The operations 335 performed at station 7 depend on the type of carrier 400 used. FIG. 9A depicts the removal of carrier 400 to create a modified assembly 905. FIG. 9B depicts portion 400A of carrier 400 left remaining in assembly 905 to act as a mask 900A for minimizing the effects of paste shedding that can occur in battery cycling. In alternative embodiments, carrier 500 may also or alternatively be removed.

Stations 8 and 9: the modified assembly 905 is placed in an oven to be cured at step 340, after which it can be stored at step 345.

According to embodiments of the invention, the exemplary manufacturing paste process depicted in the flowchart 300 of FIG. 3 may be a manual or batch process. However, high-volume processing may use a continuous in-line automated flow through each operation. Additionally, a flash dryer process step may be included for stacking assemblies prior to curing/drying. Such a step may be performed after the electrode substrate and paste are connected, so that the exposed surface can be partially dried before it is placed into the ultrasonic system. This assumes that the electrode substrate side of the paste after flash drying is still wet enough to make solid contact with the electrode substrate.

By applying ultrasound and mechanical pressure to assembly 600 the resultant movement at a microscopic level allows the paste to fill in the gaps 1000 visible at 1000 between the paste and the electrode as shown in FIG. 10A so that no gaps exist, as depicted in FIG. 10B.

The ability to fill in gaps (small or large) creates a new opportunity to intentionally create contoured and/or roughened substrate surfaces that result in increasing the effective area between the electrode substrate 100, 200 and the paste 415. This not only improves adhesion at the interface between paste and substrate but it provides a greater diversity of ionic and electron flow. This diversity improves performance, e.g., reduced impedance, increased utilization of the paste.

The previously described processing method only applies to one side of the electrode substrate. In some bipolar applications it may be adequate to just process the PAM 210 paste, for example, with a standalone NAM plate in use. However, it is appreciated that for other applications both sides (the PAM side and the NAM side) of the bipole electrode may be treated.

In addition, above-described methods are applicable to pasting for monopole electrodes. Currently, monopole electrodes use a grid type electrode substrate 100. In one embodiment the pasted monopole electrodes, produced by a standard monopole pasting machine, is placed into an ultrasonic system with pressure and ultrasonic energy is applied to one or both sides of a monopole electrode substrate depending on the penetration of the ultrasonic energy. In another embodiment the monopole processing is the same as described herein for dual side processing of a bipole electrode, however in this case, both sides are either pasted with NAM 205 or both sides are pasted with PAM 210.

FIG. 11 shows a modified version 1100 of carrier 500 that enables the placement of paste 415 on both sides A and B of the electrode substrate 100, 200. The combined assembly 1200, depicted in FIG. 12, is suitable for dual sided processing. For a bipole electrode the paste 415 comprises PAM 210 on one side, e.g., the top side, and NAM 205 on the other side, e.g., the bottom side, of the electrode substrate 200. For a monopole electrode 100 the paste 415 comprises PAM 210 on both top and bottom sides or NAM 205 on both top and bottom sides, depending on the combined assembly 1200 being positive or negative respectively.

Figure 13A:
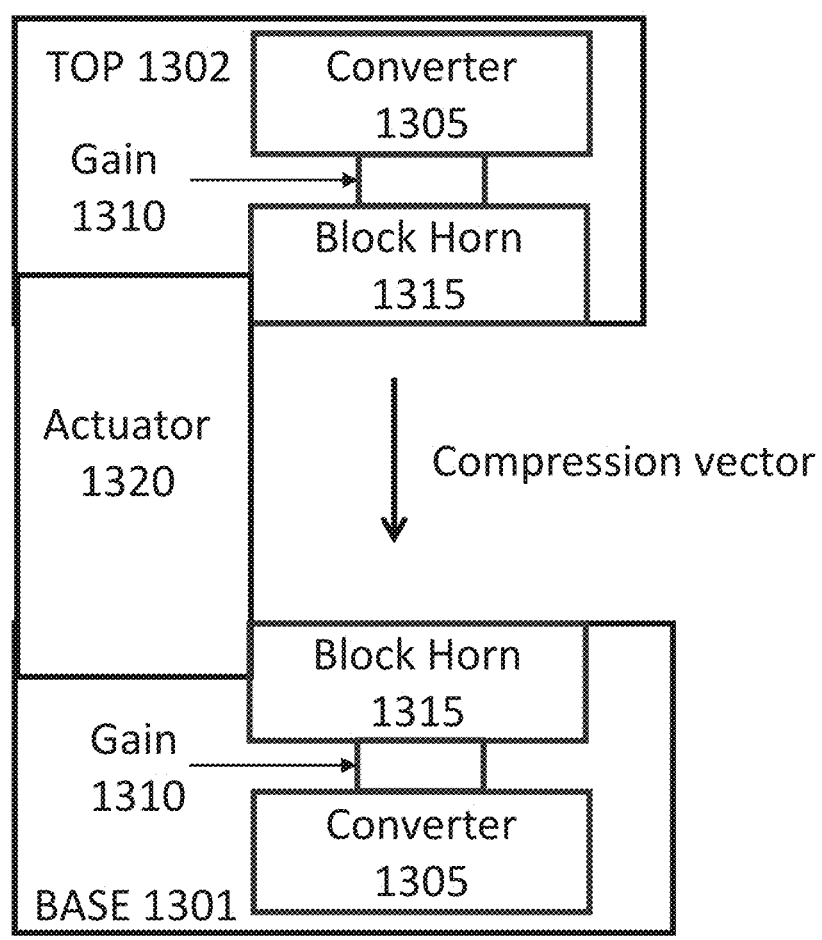
FIG. 13A is a diagram of an ultrasonic system for dual side processing.

FIG. 13A shows an ultrasonic system which can apply ultrasonic energy from above and below the location for placing assembly 1200. In ultrasonic system 1300, mechanical pressure and ultrasonic energy is applied to assembly 1200. The ultrasonic system 1300 comprises a base 1301, a top 1302, and in each, a converter 1305 that converts electrical energy into mechanical vibration, a coupling and gain section (aka a booster) 1310 that provides gain to the amplitude of vibration and couples it to a horn 1315, for example, a block horn, that provides an appropriate X-Y distribution to engage with assembly 1200, a means to provide pressure in the z-direction, e.g., an electric motor or actuator 1320. Assembly 1300 can be positioned in the ultrasonic system as shown in FIG. 13B. An alternative embodiment is to invert assembly 1200 and position it in the ultrasonic system, similar to as described above with reference to FIG. 7C. In either case once assembly 1200 is positioned in the ultrasonic system 1300, then ultrasound energy and mechanical pressure is applied to assembly 1200 per a desired protocol that specifies the pressure, ultrasound frequency, power and amplitude of the ultrasound as a function of time, for example, as depicted in the graph 800 in FIG. 8.

Additional embodiments of the invention involve a new method and associated apparatuses that use multiple layers of paste rather than a single layer of paste. The above described embodiments enable these additional embodiments because the above described embodiments do not mix the layers of paste, since the joining of the layers of paste is accomplished by application of pressure perpendicular to the plane of the electrode substrate together with the application of ultrasonic energy.

The use of only a single layer of paste is well known in the art. Paste is formulated to best address the needs of the application. However, those needs may be conflicting from the perspective of paste formulation, e.g., for example, a paste that has good adhesion may not have good energy capacity, or durability. Therefore, prior art paste formulation is a compromise. The below described embodiments can use multiple layers of paste to optimize the performance of a battery for the specific application without compromising performance.

One of the below described embodiments relates to layered PAM paste 210 formulations, while another relates to layered NAM paste 205 formulations. Both embodiments relate to the above-described embodiments and the processing steps/equipment discussed in FIGS. 3-13B but modified to accommodate the paste assemblies in the below described embodiments.

According to the following embodiments, improved battery performance is achieved by layering pastes made possible because of physical locations of failure mechanisms. For example, a corrosion layer forms between the electrode substrate and the paste. The inability of forming a good corrosion layer is a common failure mechanism in bipolar lead acid batteries. It is therefore advantageous to use a first layer of paste (layer in contact with the electrode substrate) that provides good adhesion to the electrode substrate. As another example, shedding or flaking of paste is known to lead to soft shorts within a battery cell, i.e., such shedding or flacking creates a current leakage path. It is therefore advantageous to use a second layer of paste that provides good cohesion properties on top of the first layer of paste.

Figure 16:
FIG. 16 is a SEM photograph of a layered paste assembly.
Figure 17:
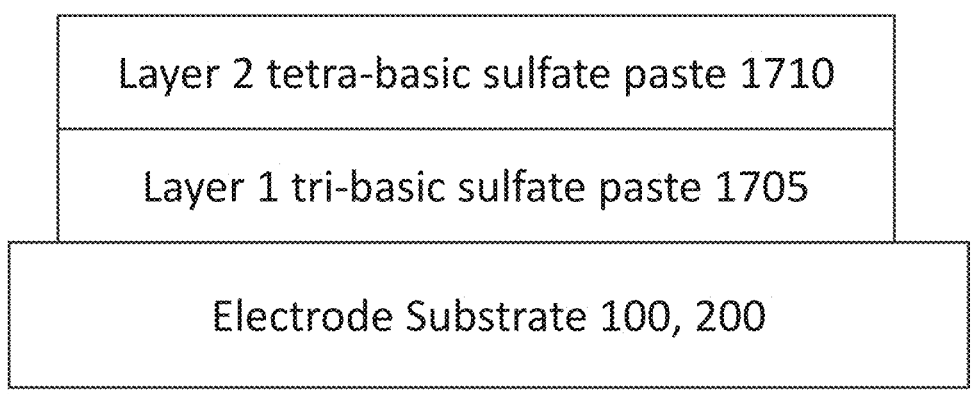
FIG. 17 is an example of an electrode with layered pasting.

According to one embodiment related to layered PAM formulations, the composition and structure of layered PAM pastes is improved. Traditionally PAM paste contains lead sulfate which is either tetra-basic or tri-basic. Tetra-basic paste, a SEM photo of which is provided at 1400 in FIG. 14, has the advantages of stronger paste, e.g., better cohesion, and a better cycle life. Tri-basic paste, a SEM photo of which is provided at 1500 in FIG. 15, has advantages of better utilization and higher capacity. Therefore, in one embodiment the paste is layered, such that the first layer (layer in contact with the electrode substrate) is tri-basic and the second layer is tetra-basic, a SEM photo of which is provided at 1600 in FIG. 16. This embodiment is suitable for deep cycle batteries, having high capacity and better cycle life. FIG. 17 provides a block diagram 1700 of a first layer of tri-basic sulfate paste 1705 and a second layer of tetra-basic sulfate paste 1710, both atop an electrode substrate 100, 200.

According to one embodiment related to layered NAM formulations, NAM does not have the corrosion layer problem that PAM does. However, charge acceptance can be improved by a layered approach to the NAM paste. The first layer of paste, in contact with the electrode substrate, is designed to have a high discharge capacity, whereas the second layer is designed to have high charge acceptance.

Figure 18:
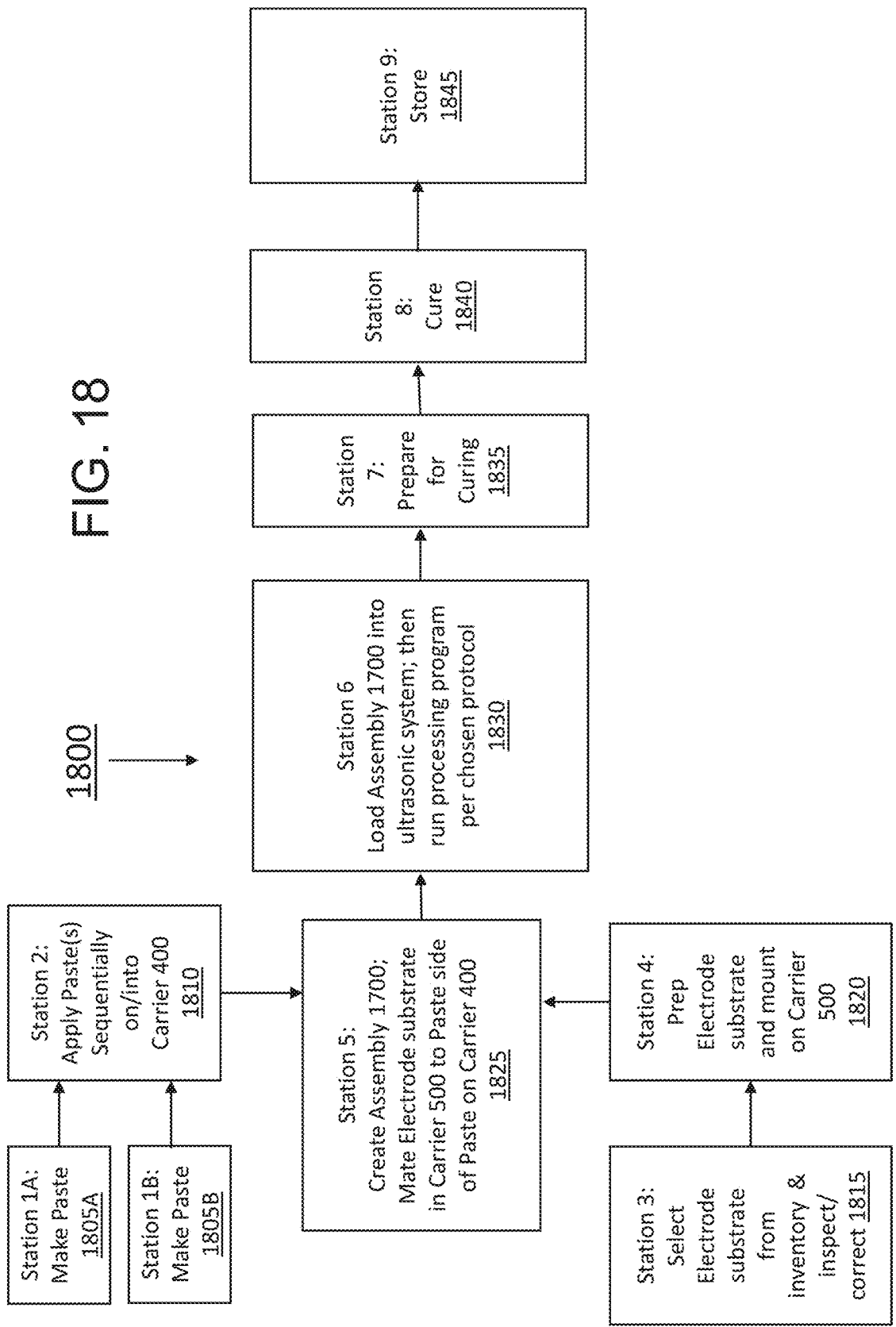
FIG. 18 is a block diagram of an exemplary process flow for layered pasting.

These embodiments modify the process flow described earlier in FIG. 3, as depicted in the modified process flow 1800 depicted in FIG. 18, where two or more pastes are layered immediately onto carrier 400. With reference to FIG. 18, process steps 1805-1845 are associated with manufacturing workstations 1-9 depicted in the figure. The partitioning of various steps into separate workstations as depicted in FIG. 18 is one example of many possible permutations and arrangements. Some of the secondary issues associated with processing are not depicted in the drawings, such as non-stick non-porous layers for any materials touching the paste, inclusion of foam layers to fill voids between layers, etc. The process steps 1805-1845 are described below, station by station.

Station 1A: A paster (a means of producing paste, either manually or automated) produces an amount of wet paste at step 1805A for a first a layer of paste. The first layer of paste may be sectioned or segmented into desired dimensions.

Station 1B: A paster (a means of producing paste, either manually or automated) produces an amount of wet paste at step 1805B for a second layer of paste. The second paste may be sectioned or segmented into desired dimensions.

Station 2: One or more sections or segments of multiple layers of paste are applied, sequentially, at step 1810 into a first carrier structure, much like the carrier 400 described above. In different embodiments carrier 400 may provide different functions. One component and function of carrier 400 is a vertical portion 400A which allows for the lateral movement of layers of paste that may result from the combination of pressure and ultrasound energy. Vertical portion 400A limits the amount of lateral movement so it cannot exceed the dimensions of the cavity 420 defined by inside vertical surface of vertical portion 400A. Note that the vertical dimension y1 of vertical portion 400A is less than the vertical dimension y2 of the layers of paste. This allows force to be applied, for example, by an ultrasonic system, to multiple layers of paste and limits the amount of vertical displacement of the layers of paste. Another component and function of carrier 400 is a horizontal portion 400B that provides protection of the surface of the first layer of paste that is adjacent the horizontal portion 400B. Portion 400B comprises a material that does not adhere to the first layer of paste.

Station 3: An electrode substrate, e.g., electrode 100 or 200, to which the layers of paste are to be sequentially applied, is first inspected and any debris or defects corrected at step 1815.

Station 4: With reference to FIG. 5, the prepared electrode substrate 100, 200 is then placed into a second carrier, referred to herein as carrier 500, at step 1820.

Station 5: Carrier 400 and Carrier 500 are positioned at step 1825 so the layers of paste are brought into contact with the surface of electrode substrate 100, 200 to make assembly 1700 depicted in FIG. 17.

Station 6: an ultrasonic system 700, such as shown in FIG. 7A, provides the means of providing mechanical pressure and ultrasonic energy to assembly 1700. In one embodiment, the ultrasonic system is a typical ultrasonic welder such as the Branson branded 2000X series of ultrasonic welders available from Sonitek Corporation. The ultrasonic system 700 comprises a base 701, a top 702, a converter 705 that converts electrical energy into mechanical vibration, a coupling and gain section (aka a booster) 710 that provides gain to the amplitude of vibration and couples it to a horn 715, for example, a block horn, that provides an appropriate X-Y distribution to engage with assembly 600, a means to provide pressure in the z-direction, e.g., an electric motor or actuator 720. Assembly 1700 can be positioned in the ultrasonic system as shown in FIG. 7B. An alternative embodiment is to invert assembly 1700 and position it in the ultrasonic system as shown in FIG. 7C. In either case once assembly 1700 is positioned in the ultrasonic system 700, then ultrasound energy and mechanical pressure is applied to assembly 1700 per a desired protocol at step 1830 that specifies the pressure, ultrasound frequency, power and amplitude of the ultrasound as a function of time, for example, as depicted in the graph 800 in FIG. 8.

Station 7: after assembly 1700 has been processed at station 6, it is moved to station 7 to prepare for curing. The operations performed at step 1835 depend on the type of carrier 400 used. FIG. 9A depicts the removal of carrier 400 to create a modified assembly 905 with one layer of paste. It is appreciated the modified assembly may include two layers of paste according to this embodiment. FIG. 9B depicts portion 400A of carrier 400 left remaining in assembly 905 to act as a mask 900A for minimizing the effects of paste shedding that can occur in battery cycling.

Stations 8 and 9: the modified assembly 905, with two layers according to this embodiment, is placed in an oven to be cured at step 1840, after which it can be stored at step 1845.

Another embodiment introduces the second layer of paste after the first layer has received one application of ultrasound. The second layer is then added to the first layer and a second application of ultrasound in completed.

Yet another embodiment applies ultrasound to the layered pastes before they are integrated with carrier 500. The intention with this embodiment is to secure the layers to themselves and then secure the composited layers to the electrode with a second ultrasound application.

What is claimed is:

1. A system for creating a cell for a monopole or bipole lead acid battery, comprising:
   a first carrier structure to receive a wet paste from a paster;
   a second carrier structure to receive an electrode substrate;
   a combining station at which to combine the first carrier structure and corresponding wet paste and the second carrier structure and corresponding electrode substrate into an assembly;
   an ultrasonic welding system to receive the assembly and provide mechanical pressure and ultrasonic energy to the assembly; and
   a removal station to remove at least one of the first and second carrier structures to create a modified assembly.

2. The system of claim 1, wherein the first carrier structure comprises:
   a vertical portion defining a cavity to limit lateral movement of the paste; and
   a horizontal portion comprising a material that does not adhere to the paste.

3. The system of claim 1, wherein the ultrasonic welding system comprises:
   a converter to convert electrical energy to mechanical vibration;
   a gain section coupled to the converter; and
   a block horn coupled to the gain section.

4. The system of claim 1, wherein the ultrasonic welding system is configured to:
   apply the mechanical pressure perpendicular to a plane of the electrode substrate; and
   maintain separation between multiple paste layers.

5. The system of claim 1, wherein the electrode substrate comprises:
   a monopole electrode substrate; or
   a bipole electrode substrate.

6. The system of claim 1, further comprising the paster; and
   wherein:
   the paster produces a first layer of wet paste and a second layer of wet paste;
   the first layer comprises tri-basic sulfate paste; and
   the second layer comprises tetra-basic sulfate paste.

7. The system of claim 6, further comprising:
   a third carrier structure to receive the second layer of wet paste;
   wherein the combining station combines the first, second and third carrier structures.

8. A method for creating a cell for a lead acid battery, the method comprising:
   receiving a wet paste at a first carrier structure;
   receiving an electrode substrate at a second carrier structure;
   combining the carrier structures into an assembly;
   applying mechanical pressure and ultrasonic energy; and
   removing at least one carrier structure.

9. The method of claim 8, further comprising:
   limiting lateral movement of the paste using a vertical portion of the first carrier structure; and
   protecting a paste surface using a horizontal portion comprising a material that does not adhere to the paste.

10. The method of claim 8, wherein applying mechanical pressure and ultrasonic energy comprises:
    converting electrical energy to mechanical vibration;
    coupling the vibration through a gain section; and
    distributing the vibration via a block horn.

11. The method of claim 8, further comprising:
    selecting between a monopole electrode substrate and a bipole electrode substrate; and
    mounting the selected substrate on the second carrier structure.

12. The method of claim 8, further comprising:
preparing the assembly for curing by removing at least one carrier structure; and
curing the assembly thermally.

13. The method of claim 8, wherein the receiving the wet paste comprises:
receiving a first layer of tri-basic sulfate paste;
receiving a second layer of tetra-basic sulfate paste.

14. The method of claim 13, further comprising:
receiving the second layer at a third carrier structure; and
combining the first, second and third carrier structures.

15. The method of claim 14, wherein applying mechanical pressure comprises:
applying pressure perpendicular to a plane of the electrode substrate; and
maintaining separation between multiple paste layers.

\* \* \* \* \*